(12) United States Patent
Wagner (10) Patent No.: US 9,225,852 B2
(45) Date of Patent: Dec. 29, 2015

(54) SELECTION OF AFP OBJECTS IN PRINT DATA BY USE OF STACKS

(71) Applicant: David Wagner, Broomfield, CO (US)

(72) Inventor: David Wagner, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/176,945

(22) Filed: Feb. 10, 2014

(65) Prior Publication Data

US 2015/0229784 A1 Aug. 13, 2015

(51) Int. Cl.
*G06K 15/00* (2006.01)
*H04N 1/00* (2006.01)

(52) U.S. Cl.
CPC ....... *H04N 1/00127* (2013.01); *H04N 1/00957* (2013.01)

(58) Field of Classification Search
CPC ..... G06F 3/1214; G06F 3/122; G06F 3/1244; G06F 3/1288; H04N 1/00127; H04N 1/00957
USPC ........................................ 358/1.1, 1.16, 1.13
See application file for complete search history.

(56) References Cited

U.S. PATENT DOCUMENTS

| | | | |
|---|---|---|---|
| 8,049,940 B2 | 11/2011 | Harman | |
| 2005/0018216 A1 | 1/2005 | Barsness | |
| 2006/0256357 A1* | 11/2006 | Hochwender et al. | 358/1.13 |
| 2010/0134851 A1 | 6/2010 | Ebitani | |
| 2010/0214614 A1 | 8/2010 | Ferlitsch | |
| 2012/0081746 A1 | 4/2012 | Yamaguchi | |

* cited by examiner

*Primary Examiner* — Iriana Cruz
(74) *Attorney, Agent, or Firm* — Duft Bornsen & Fettig LLP (57) ABSTRACT

Systems and methods are provided for utilizing stacks to identify Advanced Function Presentation (AFP) objects. The system includes a memory and a controller. The memory is able to store AFP print data. The controller is able to perform a parsing process on the AFP print data to identify AFP objects. During the parsing process the controller is able to: (A) advance a parsing location within the AFP print data, and (B) if the parsing location corresponds with a BEGIN field for an AFP object, then push an entry representing the AFP object onto a stack. During the parsing process, the controller is further able to (C) determine whether the stack matches a pattern of entries defined by a rule, (D) if the stack matches the pattern, then process the AFP object at the parsing location to perform an action defined in the rule, and (E) repeat operations (A)-(D).

20 Claims, 9 Drawing Sheets

SELECTION OF AFP OBJECTS IN PRINT DATA BY USE OF STACKS

FIELD OF THE INVENTION

The invention relates to the field of printing, and in particular, to print data.

BACKGROUND

Advanced Function Presentation (AFP) is a format used to store print data for print jobs. For example, the AFP format may be used for print jobs that include thousands of individual documents (such as billing statements intended for mass-mailing to customers). Because print jobs stored in AFP format often have many pages, print shop operators carefully review these print jobs before printing them in order to avoid the cost of a reprint.

Reviewing AFP print data that includes confidential information (e.g., account numbers, addresses, etc.) can be a complicated process, as in many cases the print shop operator is not allowed to view the confidential information. At the same time, the print shop operator may desire to review non-confidential portions of the print job in order to check for typos or general formatting issues that would otherwise result in the need for a reprint. Thus, print shop operators continue to desire effective techniques for revising and reviewing AFP files, particularly AFP files that include confidential data.

SUMMARY

Embodiments described herein are capable of finding AFP objects within AFP print data, based upon rules. Embodiments described herein parse AFP print data in order to find the AFP objects indicated by the rules. Specifically, embodiments described herein build a stack in memory while parsing AFP print data. An entry may be pushed to the stack for each detected AFP object in the AFP print data, and an entry may be popped from the stack each time the end of an AFP object is detected. Thus, at any point in time, the combination of entries in the stack represents how the currently parsed AFP object is nested/stored within other AFP objects. Based on this positional information, the current AFP object being parsed may be modified (e.g., scrambled/encrypted) and/or displayed for review as desired.

One embodiment is a system for selecting/identifying AFP objects. The system includes a memory and a controller. The memory is able to store AFP print data. The controller is able to perform a parsing process on the AFP print data to identify AFP objects. During the parsing process the controller is able to: (A) advance a parsing location within the AFP print data, and (B) if the parsing location corresponds with a BEGIN field for an AFP object, then push an entry representing the AFP object onto a stack. During the parsing process, the controller is further able to (C) determine whether the stack matches a pattern of entries defined by a rule, (D) if the stack matches the pattern, then process the AFP object at the parsing location to perform an action defined in the rule, and (E) repeat operations (A)-(D).

Another embodiment is a method for selecting/identifying AFP objects. The method includes accessing Advanced Function Presentation (AFP) print data, and performing a parsing process on the AFP print data to identify AFP objects. The parsing process includes (A) advancing a parsing location within the AFP print data, and (B) if the parsing location corresponds with a BEGIN field for an AFP object, then pushing an entry representing the AFP object onto a stack. The parsing process also includes (C) determining whether the stack matches a pattern of entries defined by a rule, (D) if the stack matches the pattern, then processing the AFP object at the parsing location to perform an action defined in the rule, and (E) repeating operations (A)-(D).

Another embodiment is a non-transitory computer readable medium embodying programmed instructions which, when executed by a processor, are configured for performing a method for identifying AFP objects. The method includes accessing Advanced Function Presentation (AFP) print data, and performing a parsing process on the AFP print data to identify AFP objects. The parsing process includes (A) advancing a parsing location within the AFP print data, and (B) if the parsing location corresponds with a BEGIN field for an AFP object, then pushing an entry representing the AFP object onto a stack. The parsing process also includes (C) determining whether the stack matches a pattern of entries defined by a rule, (D) if the stack matches the pattern, then processing the AFP object at the parsing location to perform an action defined in the rule, and (E) repeating operations (A)-(D).

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
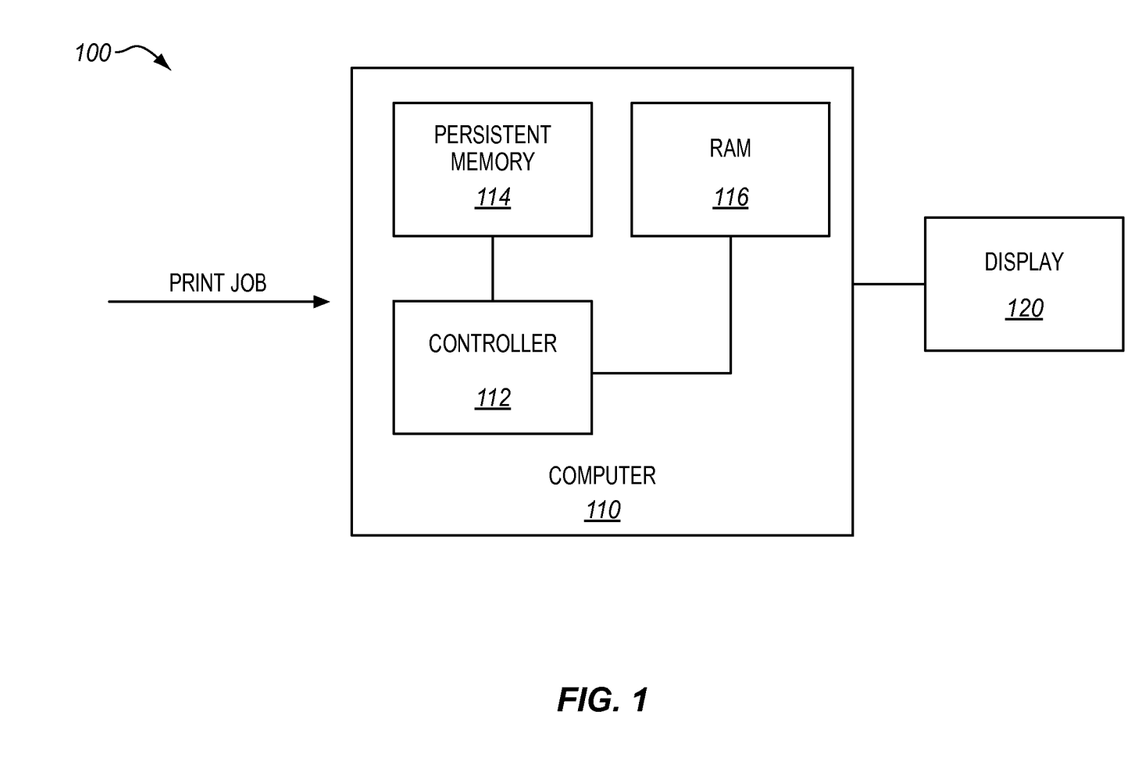
FIG. 1 is a block diagram of an AFP review system in an exemplary embodiment.

FIG. 1 is a block diagram of an AFP review system 100 in an exemplary embodiment. AFP review system 100 can be used by a print shop operator in order to view and/or revise AFP print data. For example, review system 100 may be used to "proof" a job received at a print server before the job is sent to a printer for marking.

AFP review system 100 comprises any system, device, or component operable to access AFP print data in order to display and/or revise that print data (e.g., so that a user may review it). AFP review system 100 may comprise, for example, a general-purpose computer, server, network, etc.

AFP review system 100 has been enhanced to utilize stack-based techniques to select AFP objects. Specifically, review system 100 uses entries in a stack to represent AFP objects that are detected while parsing the print data. A stack occupies little space in memory, even when many objects (e.g., millions) are parsed over a period of time. This benefit results from AFP review system 100 pushing new entries onto the stack in response to detecting new AFP objects, and popping entries from the stack when the end of an AFP object is detected. Since the stack is not required to track the properties of every object in the print data at once, the stack takes up less space in memory than alternative techniques.

In this embodiment, AFP review system 100 includes controller 112, persistent memory 114, and Random Access Memory (RAM) 116. Controller 112 manages the operations of computer 110, and may be implemented as custom circuitry, a processor executing programmed instructions, etc. Controller 112 may periodically retrieve print data from persistent memory 114 (e.g., a disk drive) and load the print data into RAM 116 for processing. Furthermore, controller 112 may utilize display 120 (e.g., a monitor, screen, etc.) in order to display selected or revised portions of print data.

The particular arrangement, number, and configuration of components described herein is exemplary and non-limiting. Illustrative details of the operation of AFP review system 100 will be discussed with regard to FIG. 2. Assume, for this embodiment, that AFP review system 100 has received an AFP print job from an interface with an external device, and has stored the received print job in persistent memory 114 for review.

Figure 2:
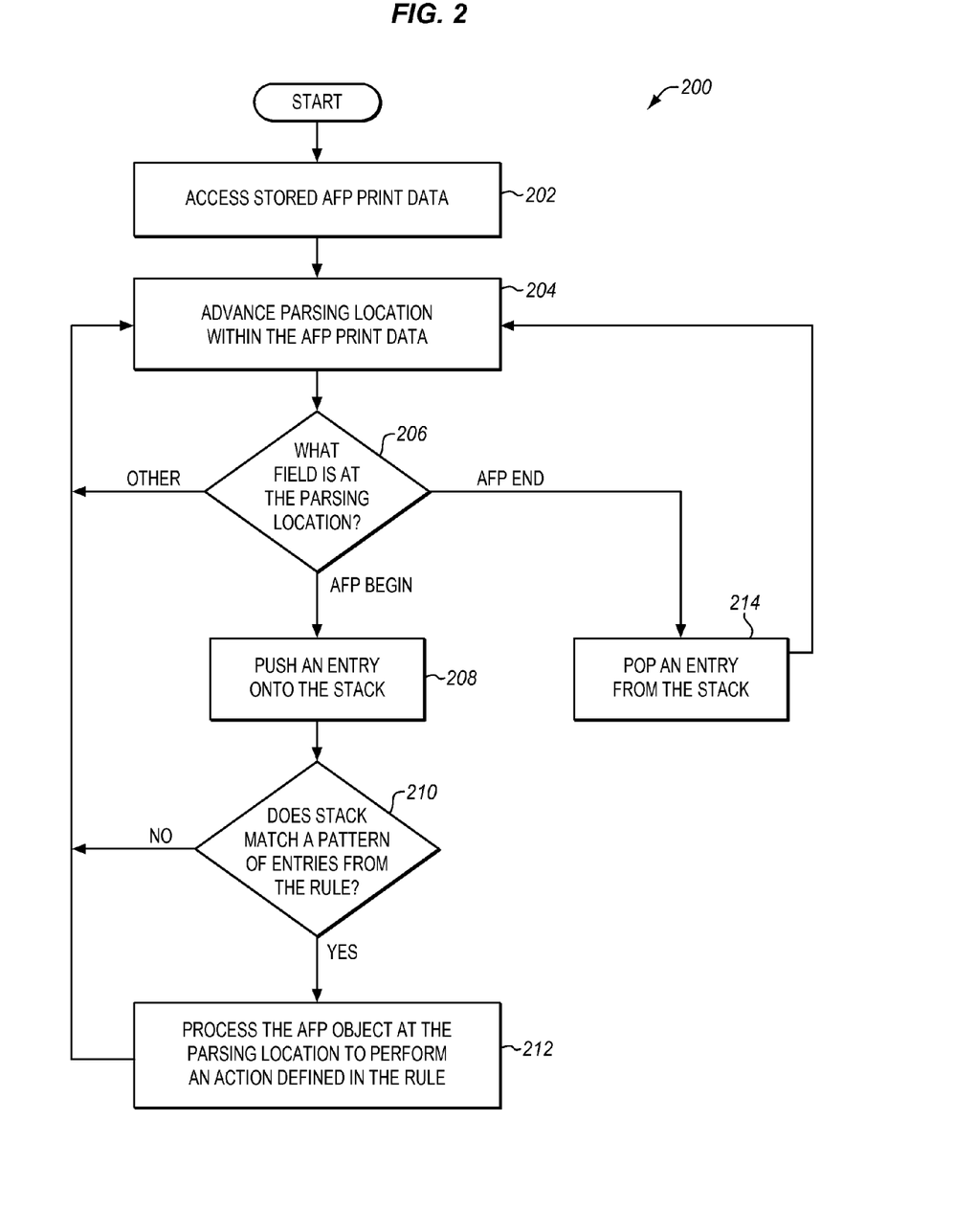
FIG. 2 is a flowchart illustrating a method for operating an AFP review system in an exemplary embodiment.

FIG. 2 is a flowchart illustrating a method 200 for operating an AFP review system in an exemplary embodiment. The steps of method 200 are described with reference to AFP review system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 accesses AFP print data stored in memory (e.g., by loading print data into RAM 116 from persistent memory 114). The print data may comprise an AFP print job (or a portion thereof), and may be selected/accessed based on user input, information in persistent memory 114, etc.

Controller 112 may further identify a rule for selecting AFP objects. As used herein, a rule is a form of criteria for identifying and/or manipulating AFP objects. A rule provides criteria for selecting AFP objects to be modified/displayed, and a rule further defines an action to perform on AFP objects within the print data. For example, a rule may define a pattern/arrangement showing how certain AFP objects are stored/nested within other AFP objects. In a set of nested AFP objects, at least one child AFP object is defined within the data/fields for a parent AFP object.

A rule may additionally indicate desired properties of each of the AFP objects to be selected. Thus, a rule may indicate a desired name for each AFP object as well as a desired position (e.g., text fields named "ADDRESS" that are within page objects named "CONTACT INFORMATION").

In step 204, controller 112 advances a parsing location within the AFP print data (e.g., until a new structured field as defined by the AFP standards is found within the print data at the changed parsing location).

In step 206, controller 112 determines whether the parsing location corresponds with a BEGIN field for an AFP object, an END field for an AFP object, or a field that is neither a BEGIN nor an END. If the field is a BEGIN field, in step 208 controller 112 pushes a new entry onto the stack. An entry may comprise a list of properties about the object being parsed. The new entry represents the AFP object to which the AFP BEGIN field relates. Processing continues from step 208 to step 210. Alternatively, if the field is an END field, it indicates the end of a currently parsed AFP object. Thus, in step 214 controller 112 pops an entry (i.e., the "top" entry) from the stack in response to detecting an END field and returns to step 204. In another alternative, if the field is neither an AFP BEGIN nor an AFP END, controller 112 may return to step 204 to advance the parsing location to another field.

In step 210, controller 112 determines whether the stack matches a pattern of entries defined by the rule. This comparison is used to determine whether the AFP object at the parsing location should be selected. The pattern itself may indicate a specific arrangement of nested AFP objects. For example, the pattern may be a "target" that shows what entries will be on the stack when an AFP object matching the rule is at the current parsing location.

Controller 112 may additionally determine, based on the current entries for the stack, what type of object is at the current parsing location, whether the currently parsed AFP object is stored within multiple other AFP objects, and other information. For example, if the stack includes a bottom entry for a document object, a middle entry for a page object, and a top entry for a text object, this indicates that the AFP object at the parsing location is a text field within a page of a document. Based on this information the relative position/arrangement of the AFP object with respect to other AFP objects may be determined.

If the stack matches the pattern in the rule, then controller 112 processes the AFP object at the parsing location to perform an action defined in the rule in step 212. For example, controller 112 may present the AFP object via display 120, may revise the AFP object, etc. Revising the AFP object may include any suitable operations to change data within the object, including, for example, scrambling, removing/deleting, or anonymizing textual or graphical information within the AFP object (e.g., by replacing textual information with gibberish, bafflegab, or encrypted data, or by replacing a picture with a blank image of the same size). Then processing continues to step 204 to advance the parsing location. However, if the stack does not match the pattern in the rule, controller 112 continues from step 210 to step 204 to continue parsing AFP print data without manipulating the AFP object.

As method 200 is performed and fields are parsed, entries on the stack may be updated, added, or replaced depending on the nature of the fields. For example, a new entry in the stack may start out having only information indicated by a BEGIN field (e.g., the new entry may at first only describe the type of AFP object that it represents). However, controller 112 may "peek ahead" of the current parsing location by reviewing upcoming fields within the AFP object, and updating the entry in the stack to include other object properties detected in this manner (e.g., the position of the AFP object with respect to other AFP objects in the print data, information stored within fields for the AFP object, an AFP object type, an AFP object name, an AFP object container type, an AFP object sequence number, a byte offset used to locate the AFP object, etc.). This may occur, for example, between steps 208 and 210. The entry may then be popped from the stack in step 214 after an AFP END field is encountered.

Any and/or all of steps 204-214 may be performed substantially concurrently and/or independently as a part of parsing the AFP print data. For example, controller 112 may perform steps 210 and/or 212 each time the stack is updated, each time an entry is added to the stack, each time an entry is about to be removed from the stack, etc.

In an embodiment where steps 210 and 212 are performed each time an entry is about to be removed from the stack, it may be beneficial to update entries on the stack with information retrieved from fields at the current parsing location as the parsing process continues.

Using method 200, it is possible to quickly and efficiently find specific nested AFP objects within large AFP files, without using a substantial memory footprint to track the properties of each and every AFP object in the file at once. Since the stack pops entries for AFP objects that are not currently being parsed, and since a large AFP document may include millions of objects, a substantial amount of space in RAM 116 is saved. This in turn substantially enhances processing speeds.

Furthermore, the above technique does not require storage of an entire AFP print job in RAM 116 at once, which is beneficial because AFP files are often so massive that they are larger than the RAM capacity of some systems.

In a further embodiment, controller 112 may identify multiple different rules for modifying AFP objects, and may compare the stack to each of the rules while parsing the AFP print data. Furthermore, each rule may be associated with one or more actions to perform.

EXAMPLES

In the following examples, additional processes, systems, and methods are described in the context of an AFP review system that anonymizes customer data within an AFP print job that includes hundreds of thousands of individual billing statements. In this example, each billing statement is represented by an AFP object known as a document. Assume, for this example, that the AFP print job has just been received at AFP review system 100.

Figure 3:
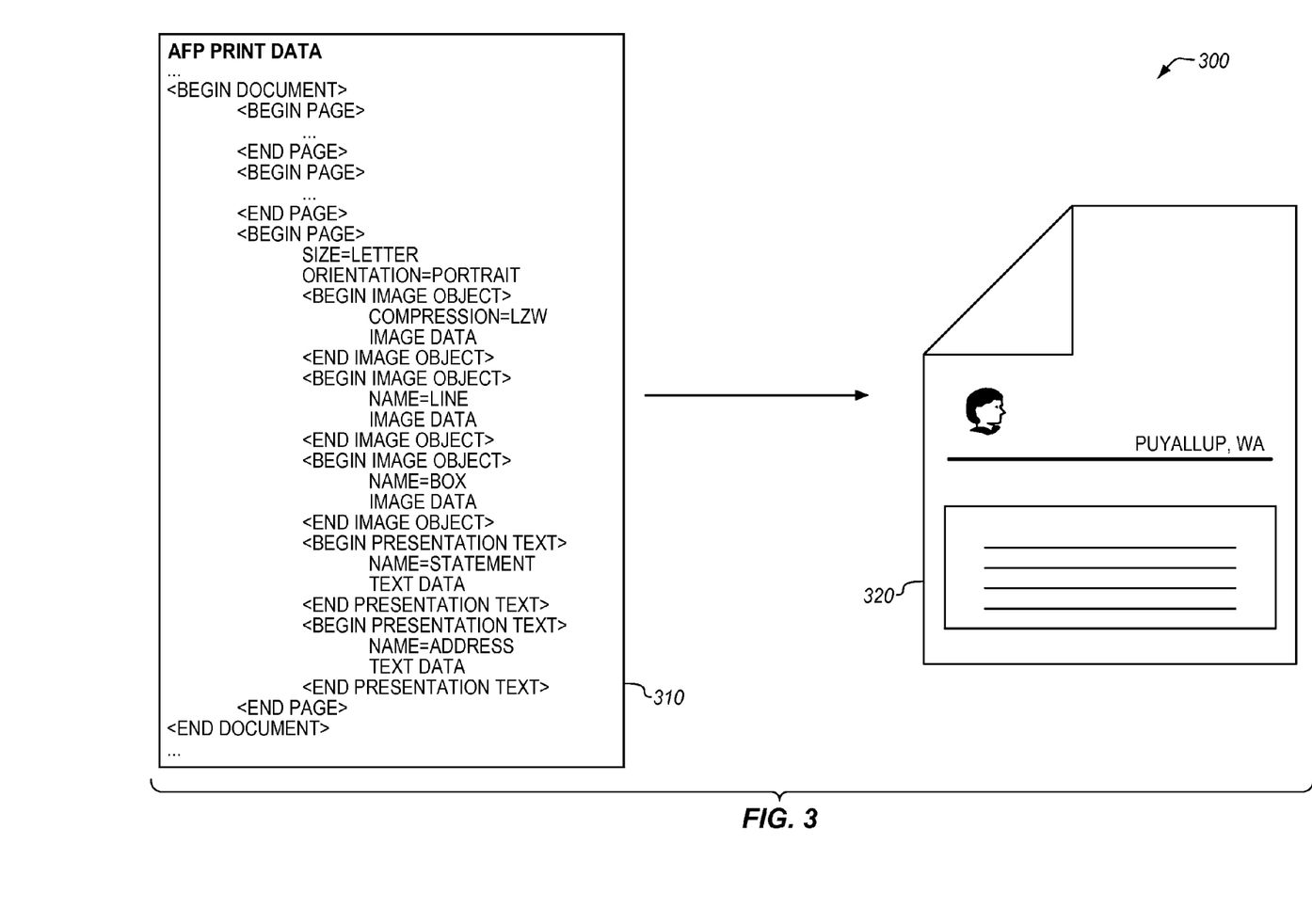
FIG. 3 is a diagram illustrating AFP print data and a rendered page in an exemplary embodiment.

FIG. 3 is a diagram 300 illustrating AFP print data 310 and a rendered page 320 in an exemplary embodiment. AFP print data 310 describes how and where to mark a page in order to generate a physical output for a specific billing statement, and page 320 represents a rendered version of page 3 of that billing statement. In short, FIG. 3 shows a billing statement existing in a raw, unprocessed initial state on the left, while showing a rendered version on the right.

Figure 4:
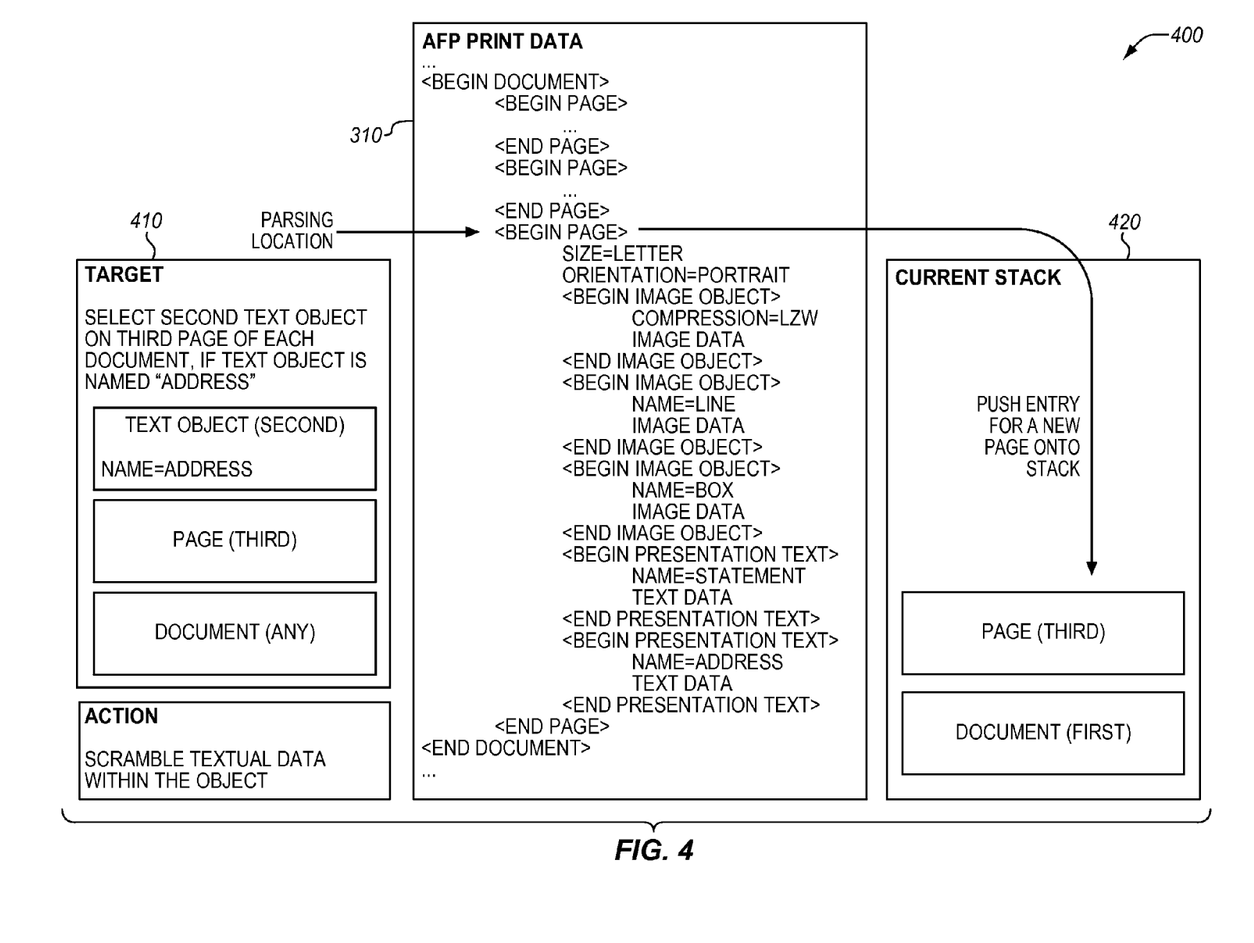
FIGS. 4-7 are diagrams illustrating the parsing of AFP print data in an exemplary embodiment.

FIG. 4 is a diagram illustrating the parsing of AFP print data 310. According to FIG. 4, a rule has been loaded into RAM 116, and the rule textually describes a target pattern 410 of nested AFP objects, as well as one or more actions to perform. Here, the statement is "select second text object on third page of each document, if text object is named ADDRESS." Based on this rule, controller 112 models target pattern 410 as a stack. Target pattern 410 shows what the current processing stack 420 would look like if an AFP object meeting the target pattern was currently being parsed. As shown in FIG. 4, target pattern 410 includes a first entry for a document of any kind, a second entry for a page that is the third within the present document, and a third entry for a text object that is the second within the present page, and also named "ADDRESS." When parsing the AFP print data and revising current stack 420, controller 112 may compare current stack 420 to target pattern 410 to determine whether the two match. According to FIG. 4, as the AFP print data loaded into RAM 116 is parsed by controller 112, new AFP BEGIN structured fields cause new entries to be pushed onto stack 420. Each time an entry is added to stack 420, stack 420 it is compared to target pattern 410. If the two match (e.g., if each of the listed objects and properties shown in the target pattern is also shown in stack 420), then the rule is applied to the current AFP object to revise the current AFP object.

As shown in FIG. 4, a new entry has been pushed onto stack 420 to indicate the presence of page three of the current document. However, stack 420 does not currently match target pattern 420.

Figure 5:
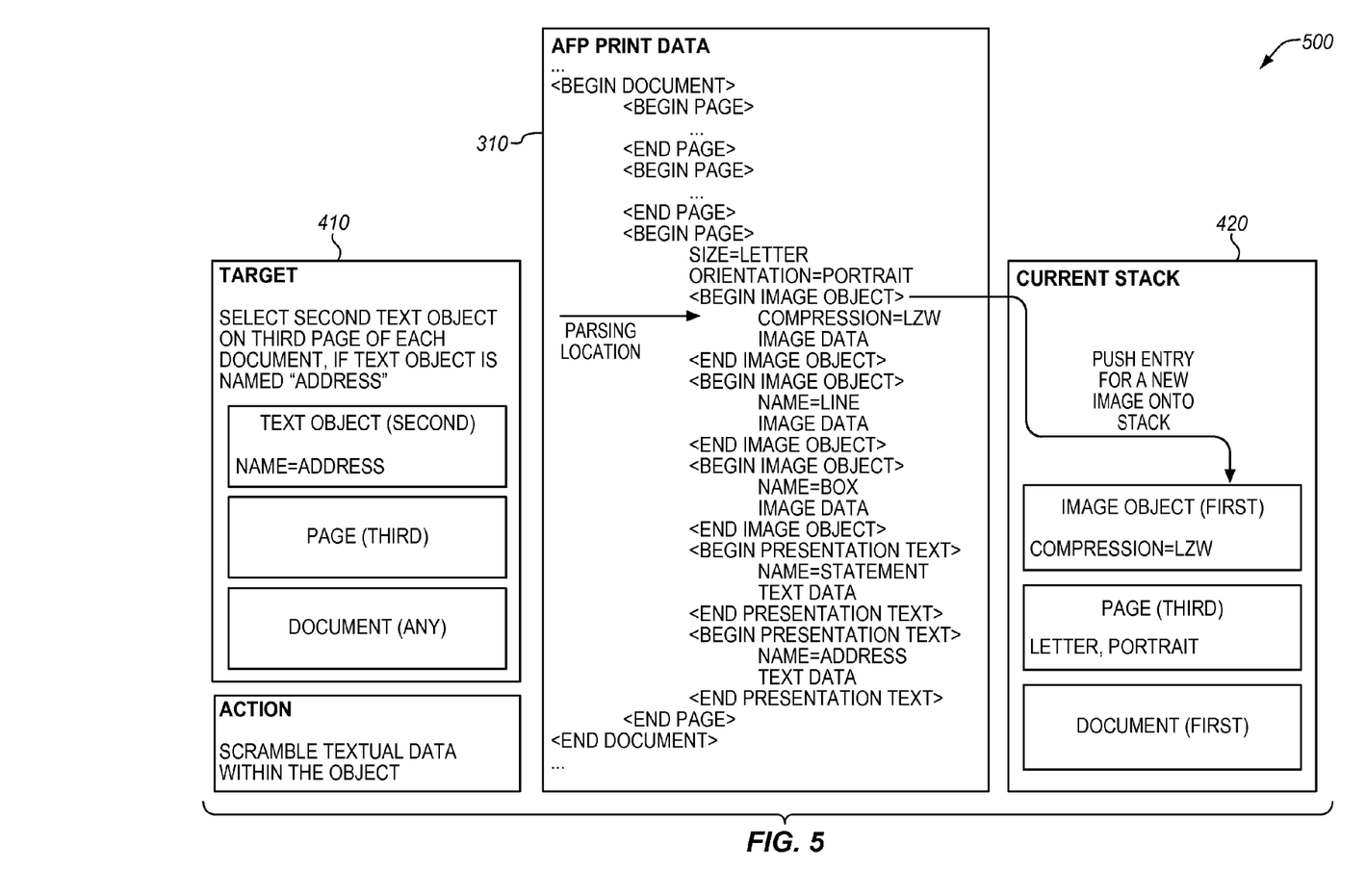

FIG. 5 is a diagram 500 that illustrates further revisions to stack 420 as parsing continues within the third page of the document. According to FIG. 5, parsing within the third page of the document has caused controller 112 to detect an image within the page, and to determine the compression method used to store data for the image. Controller 112 pushes an entry for the image onto stack 420 after detecting a new BEGIN IMAGE OBJECT structured field, and adds a property to the stack entry indicating that the compression technique used for the image was Lempel-Ziv-Welch.

In this example, controller 112 additionally uses counters and other tools to track the position of AFP objects in relation to other AFP objects. Controller 112 updates a counter each time a new page is detected within a document (e.g., in order for the counter to track the current page number within the document), each time a new picture or text object is detected within a page, etc. This counter data is used to determine whether stack 420 conforms with the target pattern defined by rule 410.

Figure 6:
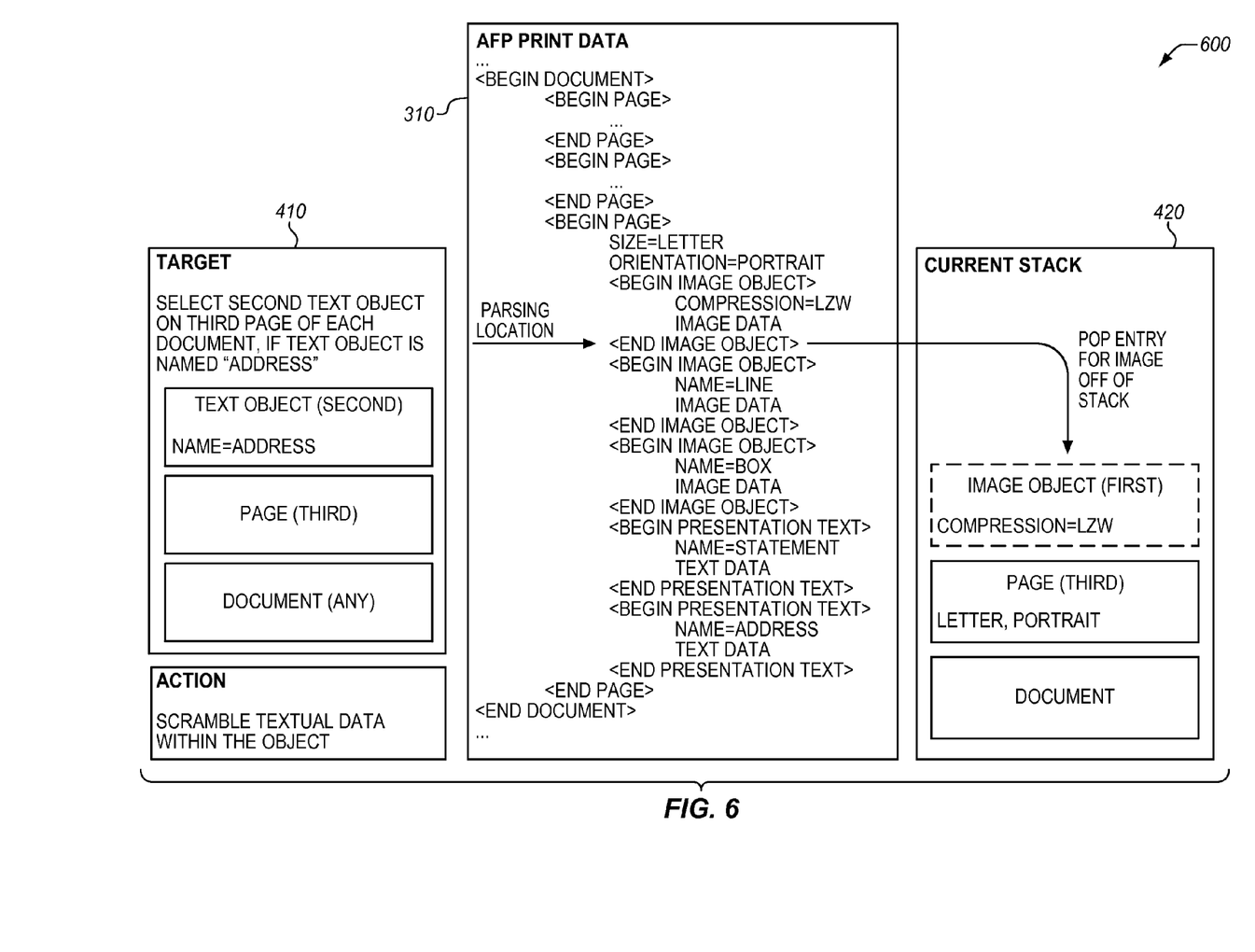

FIG. 6 is a diagram 600 that illustrates additional revisions to stack 420 as parsing continues within the third page of the document. According to FIG. 6, upon reaching an END structured field, controller 112 pops the top entry off of stack 420, thereby removing the entry for the AFP image object.

Figure 7:
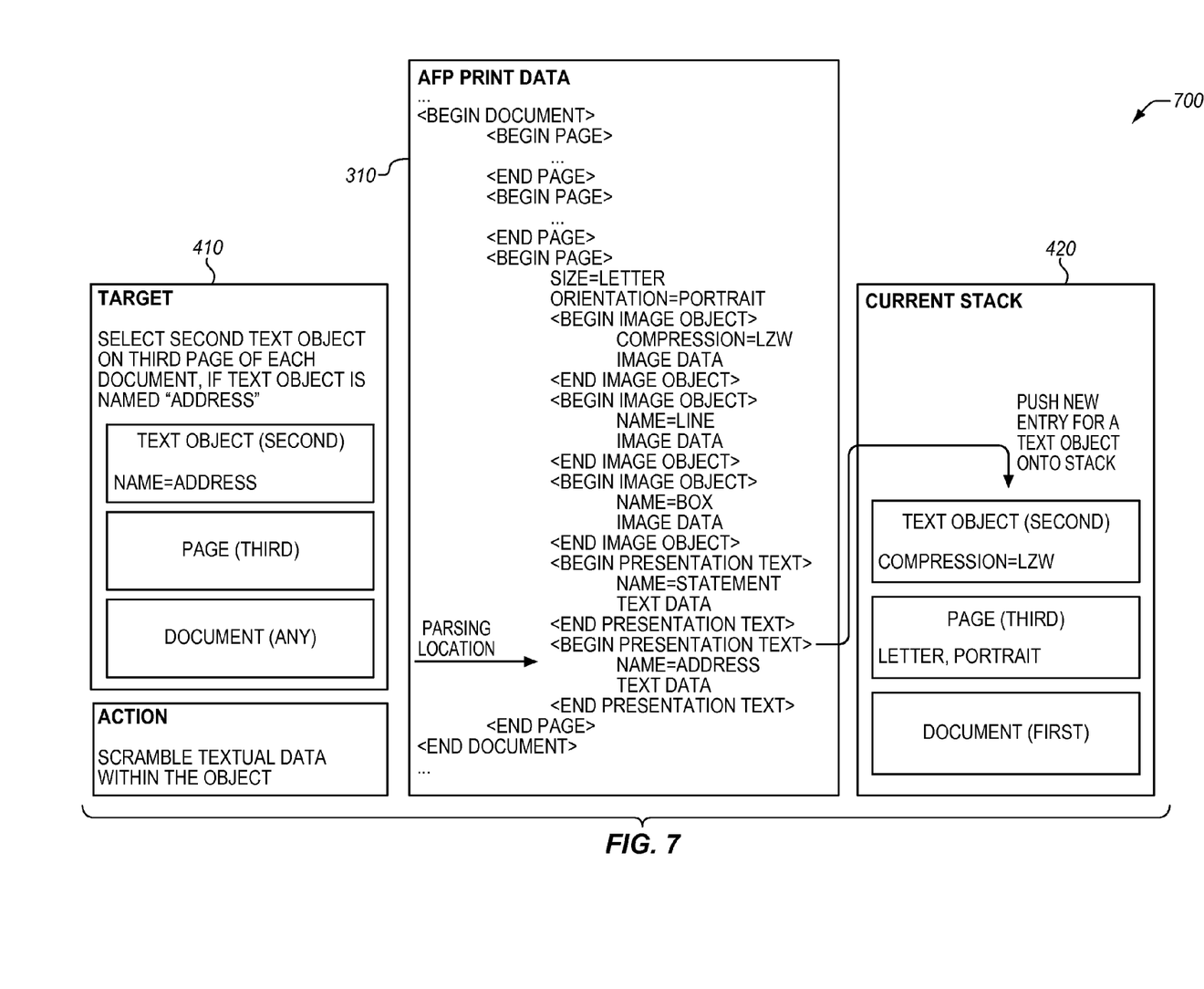

FIG. 7 is a diagram 700 that illustrates a match detected between stack 420 and target pattern 410. According to FIG. 7, each property listed for target pattern 410 is also seen in stack 420. The entries in stack 420 list more properties than shown in rule 410, but stack 420 includes each of the desired properties indicated by target pattern 410, and therefore a match is detected.

Based on the match, controller 112 performs the action indicated by the rule when it locates and revises text data within the current text object. This scrambles the text data by replacing each character with a randomly selected character, thereby anonymizing customer information within the billing statement.

Figure 8:
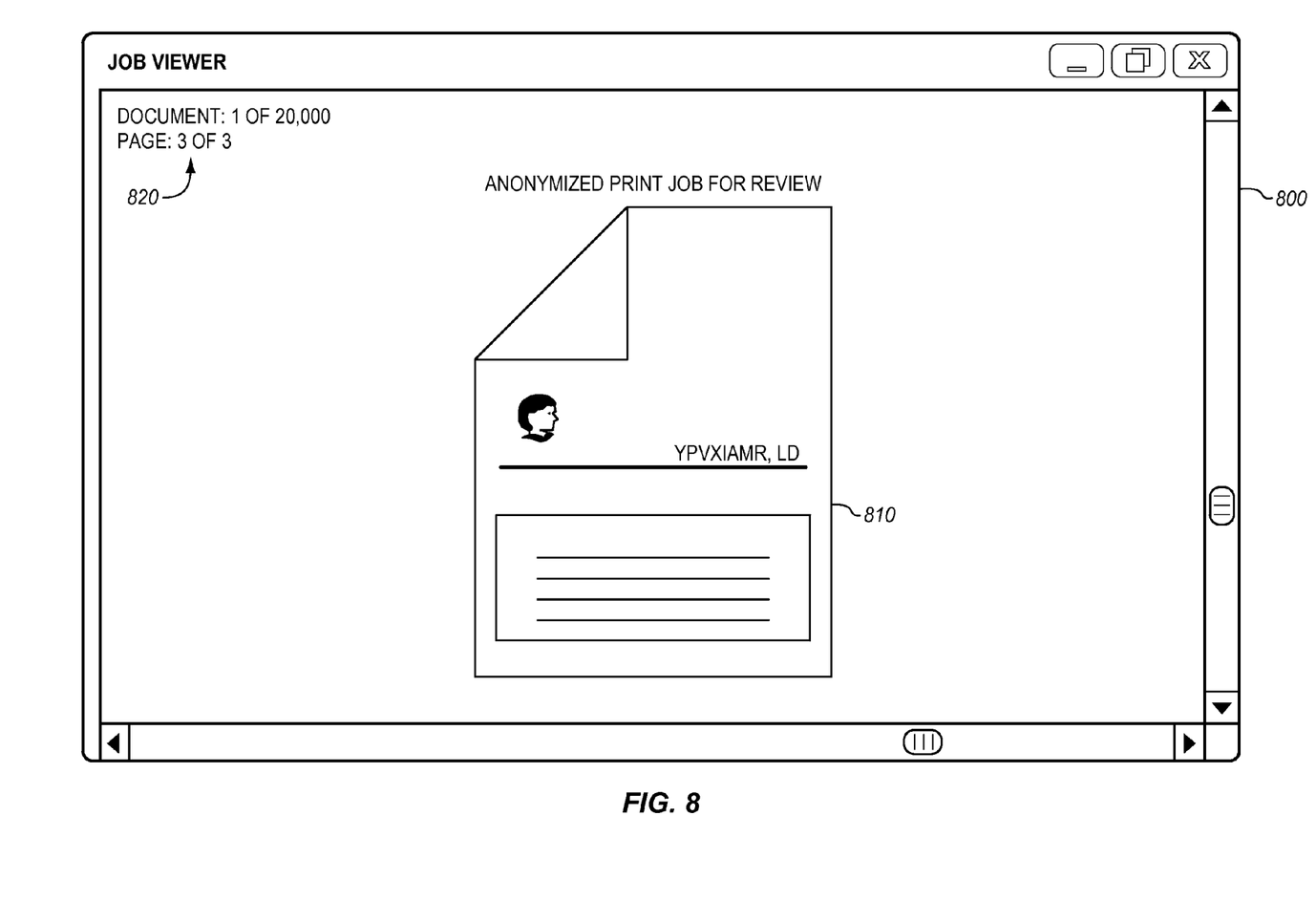
FIG. 8 is a diagram illustrating a graphical window that displays a revised rendered page in an exemplary embodiment.

FIG. 8 is a diagram illustrating a graphical window 800 that displays a revised rendered page in an exemplary embodiment. Within graphical window 800, various counters and other properties may be shown using indicators 820, while a rendered preview 810 of the current page is also shown. Rendered preview 810 includes an anonymized address, while keeping the rest of the page in its original format. This ensures that the page can be reviewed in an anonymized format, while still allowing formatting and other issues to be detected.

Figure 9:
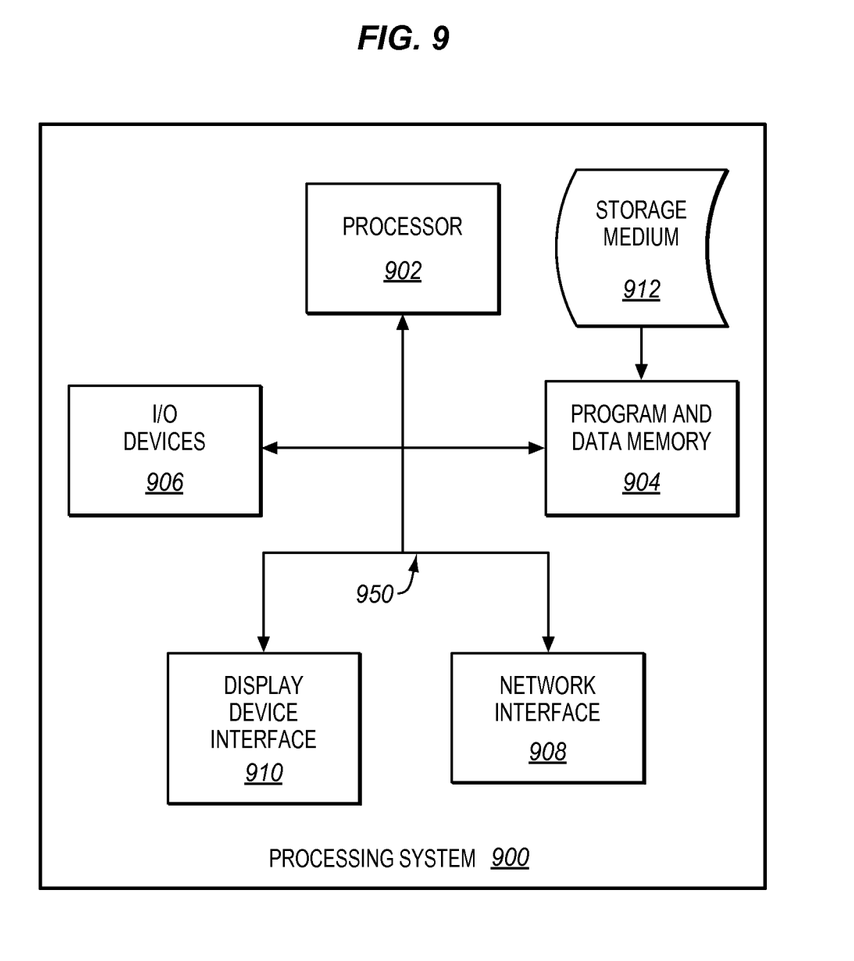
FIG. 9 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of AFP review system 100 to perform the various operations disclosed herein. FIG. 9 illustrates a processing system 900 operable to execute a computer readable medium embodying programmed instructions to perform desired functions in an exemplary embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

I claim:

1. A system comprising:
a memory configured to store AFP print data; and
a controller configured to perform a parsing process on the AFP print data to identify AFP objects, wherein during the parsing process the controller is configured to:
 (A) advance a parsing location within the AFP print data;
 (B) if the parsing location corresponds with a BEGIN field for an AFP object, then push an entry representing the AFP object onto a stack;
 (C) if the parsing location corresponds with an END field, then pop an entry off of the stack, wherein the entry represents an AFP object in the print data;
 (D) determine whether the stack matches a pattern of entries defined by a rule;
 (E) if the stack matches the pattern, then process the AFP object at the parsing location to perform an action defined in the rule;
 (F) repeat operations (A)-(E).

2. The system of claim 1, wherein:
pushing an entry comprises pushing an entry onto the top of the stack; and
popping an entry comprises popping an entry off of the top of the stack.

3. The system of claim 1, wherein:
the controller is configured to perform the action by presenting a rendered version of the AFP object at the parsing location via a display.

4. The system of claim 1, wherein:
the controller is configured to perform the action by replacing textual print data within the AFP object at the parsing location.

5. The system of claim 4, wherein:
the controller is configured to replace each character of the textual print data with a random character.

6. The system of claim 1, wherein:
during the parsing process the controller is configured to:
 (G) update an entry in the stack based on information at the parsing location, wherein repeating operations (A)-(E) further comprises repeating operation (G).

7. The system of claim 6, wherein:
the information at the parsing location is selected from the group consisting of AFP object type, AFP object name, AFP object container type, AFP object sequence number, and byte offset of the AFP object at the parsing location.

8. A method comprising:
accessing Advanced Function Presentation (AFP) print data; and
performing a parsing process on the AFP print data to identify AFP objects, wherein the parsing process comprises:
 (A) advancing a parsing location within the AFP print data;
 (B) if the parsing location corresponds with a BEGIN field for an AFP object, then pushing an entry representing the AFP object onto a stack;
 (C) if the parsing location corresponds with an END field, then popping an entry off of the stack, wherein the entry represents an AFP object in the print data;
 (D) determining whether the stack matches a pattern of entries defined by a rule;
 (E) if the stack matches the pattern, then processing the AFP object at the parsing location to perform an action defined in the rule;
 (F) repeating operations (A)-(E).

9. The method of claim 8, wherein:
pushing an entry comprises popping an entry onto the top of the stack; and
popping an entry comprises popping an entry off of the top of the stack.

10. The method of claim 8, further comprising:
performing the action by presenting a rendered version of the AFP object at the parsing location via a display.

11. The method of claim 8, further comprising:
performing the action by replacing textual print data within the AFP object at the parsing location.

12. The method of claim 11, further comprising:
replacing each character of the textual print data with a random character.

13. The method of claim 8, further comprising:
(G) updating an entry in the stack based on information at the parsing location, wherein repeating operations (A)-(E) further comprises repeating operation (G).

14. The method of claim 13, further comprising:
the information at the parsing location is selected from the group consisting of AFP object type, AFP object name, AFP object container type, AFP object sequence number, and byte offset of the AFP object at the parsing location.

15. A non-transitory computer readable medium embodying programmed instructions which, when executed by a processor, are configured for performing a method comprising:
   accessing Advanced Function Presentation (AFP) print data; and
   performing a parsing process on the AFP print data to identify AFP objects, wherein the parsing process comprises:
      (A) advancing a parsing location within the AFP print data;
      (B) if the parsing location corresponds with a BEGIN field for an AFP object, then pushing an entry representing the AFP object onto a stack;
      (C) if the parsing location corresponds with an END field, then popping an entry off of the stack, wherein the entry represents an AFP object in the print data;
      (D) determining whether the stack matches a pattern of entries defined by a rule;
      (E) if the stack matches the pattern, then processing the AFP object at the parsing location to perform an action defined in the rule;
      (F) repeating operations (A)-(E).

16. The medium of claim 15, wherein:
   pushing an entry comprises pushing an entry onto the top of the stack; and
   popping an entry comprises popping an entry off of the top of the stack.

17. The medium of claim 15, wherein the method further comprises:
   performing the action by presenting a rendered version of the AFP object at the parsing location via a display.

18. The medium of claim 15, wherein the method further comprises:
   performing the action by replacing textual print data within the AFP object at the parsing location.

19. The medium of claim 18, wherein the method further comprises:
   replacing each character of the textual print data with a random character.

20. The medium of claim 16, wherein the method further comprises:
   (G) updating an entry in the stack based on information at the parsing location, wherein repeating operations (A)-(E) further comprises repeating operation (G).

* * * * *